United States Patent
Hayakawa

(10) Patent No.: US 11,537,148 B2
(45) Date of Patent: Dec. 27, 2022

(54) AIRCRAFT INCLUDING ROTARY WINGS

(71) Applicant: SUBARU CORPORATION, Tokyo (JP)

(72) Inventor: Masahito Hayakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 316 days.

(21) Appl. No.: 16/731,956

(22) Filed: Dec. 31, 2019

(65) Prior Publication Data

US 2020/0293068 A1 Sep. 17, 2020

(30) Foreign Application Priority Data

Mar. 12, 2019 (JP) .............................. JP2019-045023

(51) Int. Cl.
| | |
|---|---|
| *G05D 1/10* | (2006.01) |
| *B64C 27/12* | (2006.01) |
| *B64C 39/02* | (2006.01) |
| *G05D 1/06* | (2006.01) |
| *G05D 1/08* | (2006.01) |

(52) U.S. Cl.
CPC ............. *G05D 1/102* (2013.01); *B64C 27/12* (2013.01); *B64C 39/024* (2013.01); *G05D 1/063* (2013.01); *G05D 1/085* (2013.01); *B64C 2201/024* (2013.01); *B64C 2201/027* (2013.01); *B64C 2201/108* (2013.01)

(58) Field of Classification Search
None
See application file for complete search history.

(56) References Cited

U.S. PATENT DOCUMENTS

| | | | |
|---|---|---|---|
| 9,897,986 B2 * | 2/2018 | McKinzie | .......... G05B 19/0423 |
| 10,845,825 B2 * | 11/2020 | Yu | ........................... B64C 15/00 |
| 2007/0164166 A1 | 7/2007 | Hirvonen | |
| 2011/0248121 A1 | 10/2011 | Hirvonen | |

(Continued)

FOREIGN PATENT DOCUMENTS

| | | |
|---|---|---|
| JP | 2009-523658 A | 6/2009 |
| WO | 2013/174751 A2 | 11/2013 |

OTHER PUBLICATIONS

Extended European Search Report issued in corresponding European Patent Application No. 20150012.1-1010, dated Jul. 20, 2020.

*Primary Examiner* — Sze-Hon Kong
*Assistant Examiner* — Davin Seol
(74) *Attorney, Agent, or Firm* — McDermott Will & Emery LLP

(57) ABSTRACT

An aircraft includes first units each including a first sensor, a rotary wing, a driver, and a first drive controller. The first drive controller is configured to generate a drive signal of the rotary wing on the basis of a flying route of the aircraft and a control law based on a flying state detected by the first sensor, and output the drive signal to the driver configured to drive the rotary wing. The control laws of the respective first drive controllers are equal to each other between the first units. The first drive controllers are each configured to generate the drive signals that correspond to all of the first units. The drivers are each configured to drive the corresponding rotary wing on the basis of corresponding one of the drive signals that correspond to all of the first units and that are generated by the first drive controllers.

1 Claim, 6 Drawing Sheets

(56) References Cited

U.S. PATENT DOCUMENTS

| | | | |
|---|---|---|---|
| 2015/0012154 A1* | 1/2015 | Senkel | B64C 27/20 |
| | | | 701/4 |
| 2015/0212523 A1 | 7/2015 | Wolf et al. | |
| 2018/0362168 A1 | 12/2018 | Clark | |
| 2019/0256191 A1* | 8/2019 | Suzuki | B64C 39/02 |
| 2019/0315465 A1* | 10/2019 | Liu | G05D 1/0011 |
| 2020/0041998 A1* | 2/2020 | Kushleyev | G05D 1/0858 |
| 2020/0103922 A1* | 4/2020 | Nonami | G05D 1/0072 |
| 2022/0006418 A1* | 1/2022 | Sato | B64D 27/24 |

* cited by examiner

AIRCRAFT INCLUDING ROTARY WINGS

CROSS-REFERENCE TO RELATED APPLICATIONS

The present application claims priority from Japanese Patent Application No. 2019-045023 filed on Mar. 12, 2019, the entire contents of which are hereby incorporated by reference.

BACKGROUND

The technology relates to an aircraft having a plurality of rotary wings.

An aircraft is high in freedom upon moving through a space and is high in moving speed as well, requiring a particular attention to safety during flight. For example, it is necessary for the aircraft to continue flying even when a controller that individually controls driving sources, such as engines, malfunctions during the flight. Accordingly, in preparation for the malfunctioning of the controller, another controller serving as its substitute may be placed into a standby state, and switchover to the other controller may be immediately performed after the controller is determined as being malfunctioning. For example, reference is made to Japanese Unexamined Patent Application Publication (Translation of PCT Application) (JP-T) No. 2009-523658.

SUMMARY

An aspect of the technology provides an aircraft that includes a plurality of first units disposed at positions that are different from each other in planar view. Each of the first units includes a first sensor, a rotary wing, a driver, and a first drive controller. The first sensor is configured to detect a flying state of the aircraft. The rotary wing is configured to provide the aircraft with lift, thrust, or both. The driver is configured to drive the rotary wing. The first drive controller is configured to generate a drive signal of the rotary wing on the basis of a flying route of the aircraft and a control law that is based on the flying state detected by the first sensor, and output the drive signal to the driver. The control laws of the respective first drive controllers are equal to each other between the first units. The first drive controllers are each configured to generate the drive signals that correspond to all of the first units. The drivers are each configured to drive the corresponding rotary wing on the basis of corresponding one of the drive signals that correspond to all of the first units and that are generated by the first drive controllers.

An aspect of the technology provides an aircraft that includes a plurality of first units disposed at positions that are different from each other in planar view. Each of the first units includes a first sensor, a rotary wing, a driver, and circuitry. The first sensor is configured to detect a flying state of the aircraft. The rotary wing is configured to provide the aircraft with lift, thrust, or both. The driver is configured to drive the rotary wing. The circuitry is configured to generate a drive signal of the rotary wing on the basis of a flying route of the aircraft and a control law that is based on the flying state detected by the first sensor, and output the drive signal to the driver. The control laws of the respective circuitries are equal to each other between the first units. The circuitries are each configured to generate the drive signals that correspond to all of the first units. The drivers are each configured to drive the corresponding rotary wing on the basis of corresponding one of the drive signals that correspond to all of the first units and that are generated by the circuitries.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
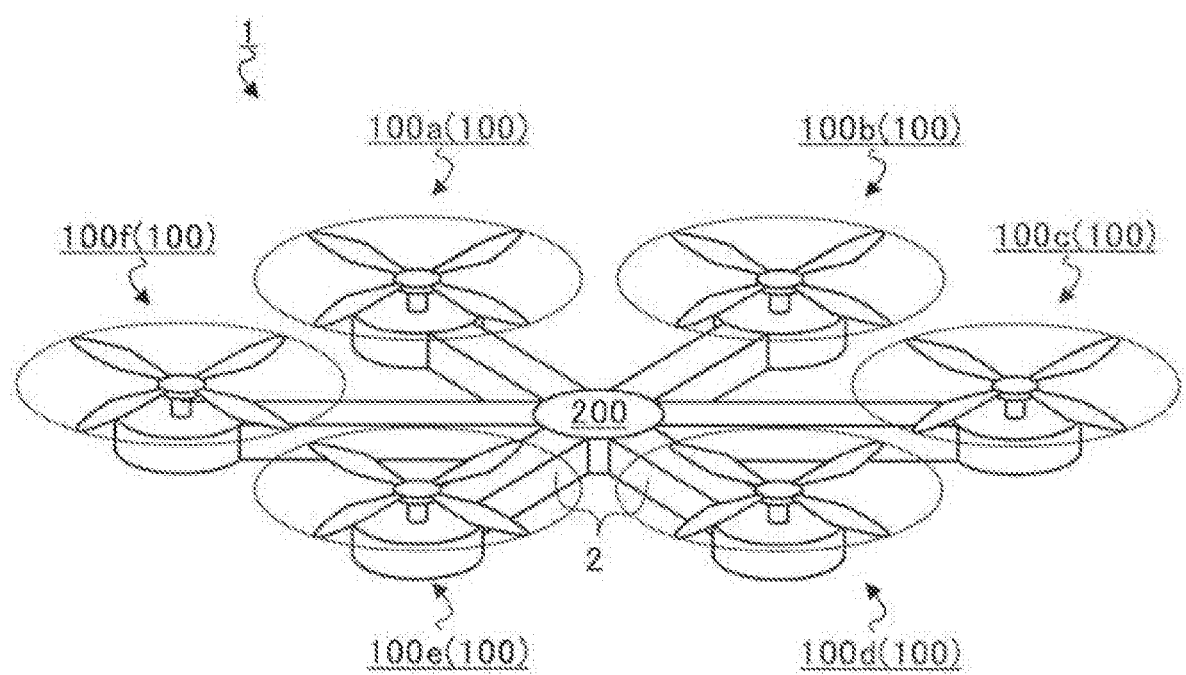
FIG. 1 is a schematic explanatory diagram illustrating an example of a configuration of an aircraft according to one example embodiment.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is a schematic explanatory diagram illustrating an example of a configuration of an aircraft 1 according to an example embodiment. The aircraft 1 includes a plurality of first units 100. In one example, the aircraft 1 may include six first units 100a, 100b, 100c, 100d, 100e, and 100f. The aircraft 1 may also include a second unit 200 and a body 2. The first units 100, the second unit 200, and the body 2 may be fixed to each other to operate as a so-called unmanned aerial vehicle or drone. The aircraft 1 according to an example embodiment may be the unmanned aerial vehicle having six rotary wings. However, in some example embodiments, the aircraft 1 may be any of various aircrafts having a plurality of rotary wings, such as Osprey aircraft. Further, the aircraft 1 is not limited to the unmanned aerial vehicle. In some example embodiments, the aircraft 1 may be a manned aerial vehicle.

The first units 100 configuring the aircraft 1 are disposed at positions that are different from each other in planar view. This means that the first units 100 may be disposed at any positions as long as their positions are different from each other when the first units 100 are projected onto a horizontal plane, and that the positions of the first units 100 are not limited in a vertical direction. The forward and the backward in terms of movement of the aircraft 1 may be fixed in advance. Optionally, the forward and the backward in terms of movement of the aircraft may be made variable depending on an orientation of the movement.

Figure 2:
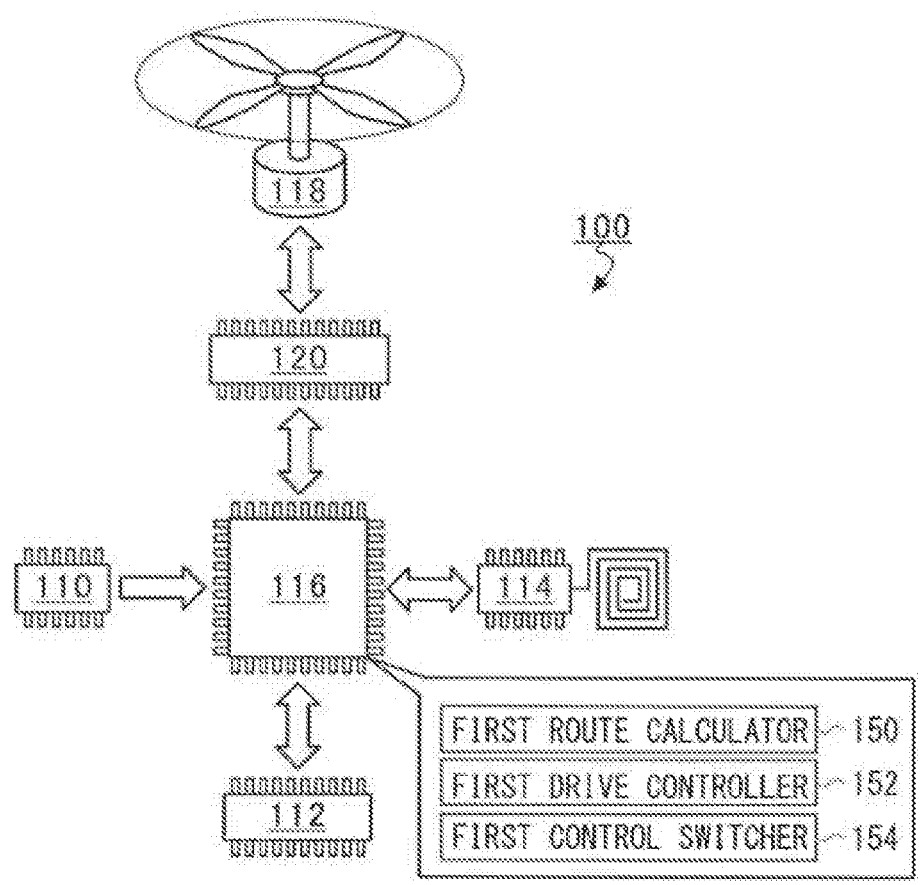
FIG. 2 is a schematic explanatory diagram that describes an example of a configuration of a first unit illustrated in FIG. 1.

FIG. 2 is a schematic explanatory diagram that describes an example of a configuration of any of the first units 100. The first unit 100 includes a first sensor 110, a first processor 116, a rotary wing 118, and a driver 120. The first unit 100 may also include a first memory 112 and a first communicator (FC) 114.

The first sensor 110 detects a current flying state of the aircraft 1. For example, the first sensor 110 may include a global positioning system (GPS) and an inertial measurement unit (IMU). The GPS may detect a flying position and an orientation of movement of the aircraft 1. The flying position may include longitude, latitude, and altitude. The IMU may detect an attitude of the aircraft 1. The first sensor 110 may also detect other factors of the aircraft 1, including a speed of movement of the aircraft 1, a direction and a speed of wind that an airframe of the aircraft 1 receives, and an atmospheric pressure, a temperature, and a humidity around the airframe of the aircraft 1.

The first memory 112 may be or may include a semiconductor integrated circuit. For example, the semiconductor integrated circuit may include a read-only memory (ROM) that holds programs, etc., and a random-access memory (RAM) that serves as a work area. In an example embodiment, the first memory may hold a program that allows for execution of a control law (a transfer function) "f" for executing a flying control.

The first communicator 114 may establish a wireless communication with an external device or an external object. Non-limiting examples of the external device or the external object may include a ground facility, another aircraft, and a vessel.

The first processor 116 may be or may include an arithmetic processor such as a central processing unit (CPU). The first processor 116 may cooperate with the program stored in the first memory 112 to operate as configuration parts including a first route calculator (FRC) 150, a first drive controller (FDC) 152, and a first control switcher (FCS) 154. In one embodiment, the first processor 116 may serve as a "first drive controller".

The first route calculator 150 may determine a flying route on the basis of a current location acquired by the first sensor 110 and a destination received via the first communicator 114, or on the basis of a current location and a destination that have been set in advance to the first memory 112. The first route calculator 150 may determine the flying route that allows a fuel consumption and/or a power consumption of the aircraft 1 to be minimum. Alternatively, the first route calculator 150 may determine the flying route that allows an arrival time to be minimum. The first route calculator 150 may alternatively receive the current location via the first communicator 114 as with the reception of the destination, instead of acquiring the current location by the first sensor 110. The first route calculator 150 may also determine the flying route on the basis of an external environment, in addition to the current location and the destination. Non-limiting examples of the external environment may include weather, an atmospheric pressure, a wind speed, and a wind direction. The flying route may include flying states at respective flying positions in the flying route. Non-limiting examples of the flying state may include an orientation of movement, a speed of movement, and an attitude.

The first drive controller 152 generates a drive signal of the rotary wing 118 on the basis of the flying route and the flying state detected by the first sensor 110, and outputs the drive signal to the driver 120.

The first control switcher 154 may switch a control system on the basis of a state of the aircraft 1. For example, the first control switcher 154 may switch the control system depending on whether the state of the aircraft 1 is normal or abnormal.

The first route calculator 150 and the first drive controller 152 may stop their respective operations in a normal state and may operate on an as-necessary basis.

The rotary wing 118 may be a propeller. The rotary wing 118 may be rotated and provides the aircraft 1 with lift, thrust, or both. More specifically, the rotary wing 118 may be rotated and provides the own first unit 100 with the lift, the thrust, or both.

The driver 120 drives the rotary wing 118. The driver 120 may include a motor or an internal-combustion engine such as a jet engine or a reciprocating engine. The driver 120 may control the number of rotations of the rotary wing 118 in accordance with the drive signal. In an example embodiment, the drivers 120 provided in the respective first units 100 may drive the corresponding rotary wings 118 independently to control the orientation of movement, the speed of movement, and the attitude of the aircraft 1.

Figure 3:
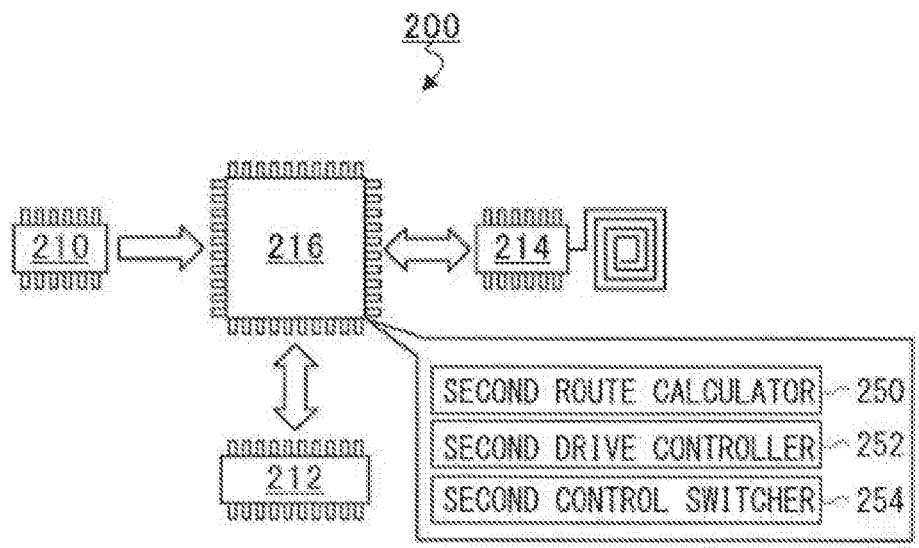
FIG. 3 is a schematic explanatory diagram that describes an example of a configuration of a second unit illustrated in FIG. 1.

FIG. 3 is a schematic explanatory diagram that describes an example of a configuration of the second unit 200. The second unit 200 may include a second sensor 210, a second memory 212, a second communicator (SC) 214, and a second processor 216.

The second sensor 210, the second memory 212, the second communicator 214, and the second processor 216 provided in the second unit 200 may be substantially the same in configuration as the first sensor 110, the first memory 112, the first communicator 114, and the first processor 116 provided in the first unit 100, respectively. Accordingly, a description of the second sensor 210, the second memory 212, the second communicator 214, and the second processor 216 is not given in detail. The second unit 200 and each of the first units 100 may form a network to allow for a wired communication or a wireless communication in a mutual fashion.

The second processor 216 may cooperate with a program stored in the second memory 212 to operate as configuration parts including a second route calculator (SRC) 250, a second drive controller (SDC) 252, and a second control switcher (SCS) 254. In one embodiment, the second processor 216 may serve as a "second drive controller".

The second route calculator 250 may determine a flying route on the basis of the current location acquired by the second sensor 210 and the destination received via the second communicator 214, or on the basis of the current location and the destination that have been set in advance to the second memory 212. The second route calculator 250 may alternatively receive the current location via the second communicator 214 as with the reception of the destination, instead of acquiring the current location by the second sensor 210. The second route calculator 250 may also determine the flying route on the basis of the external environment, in addition to the current location and the destination.

The second drive controller 252 generates drive signals of the respective rotary wings 118 on the basis of the flying route determined by the second route calculator 250 and the flying state detected by the second sensor 210, and outputs the drive signals to the respective drivers 120 of the first units 100.

The second control switcher 254 may switch a control system on the basis of the state of the aircraft 1. For example, the second control switcher 254 may switch the control system depending on whether the state of the aircraft 1 is normal or abnormal.

The aircraft 1 according to an example embodiment may include six first units 100 and one second unit 200, and may be thus provided with common sensors (i.e., the first sensors 110 and the second sensor 210), common memories (i.e., the first memories 112 and the second memory 212), common communicators (i.e., the first communicators 114 and the second communicator 214), and common processors (i.e., the first processors 116 and the second processor 216). With this example configuration, it is possible to address various concerns of configuration parts provided in the aircraft 1 and to ensure a safety appropriately. In the following, a description is given of some example configurations of the aircraft 1.

Figure 4:
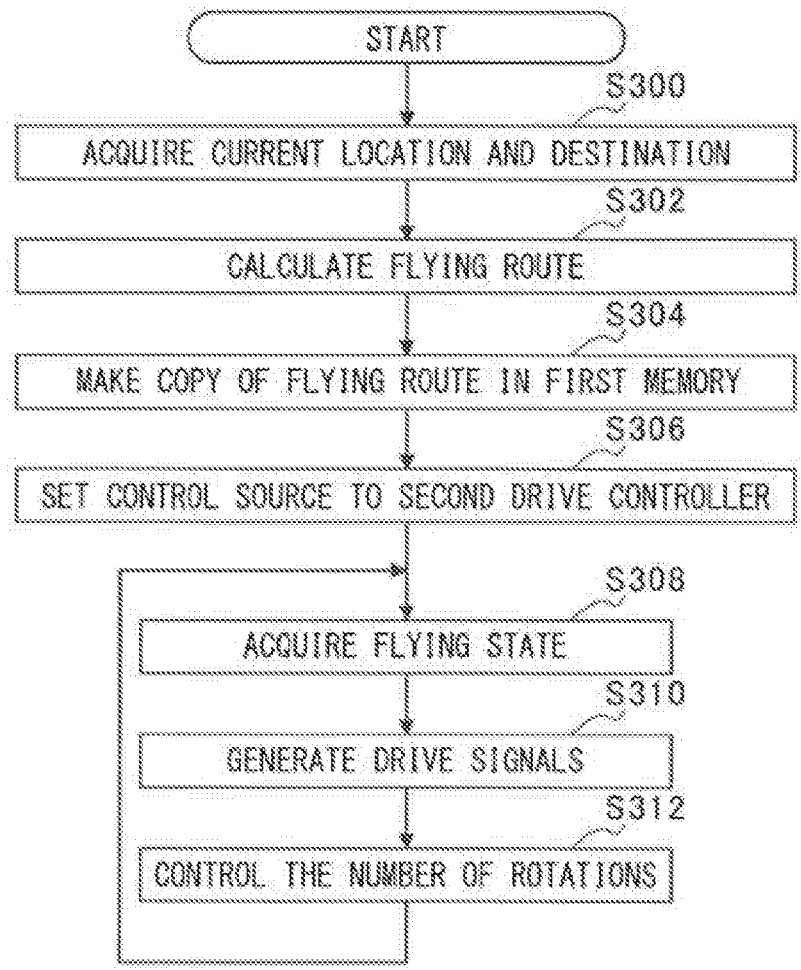
FIG. 4 is a flowchart illustrating an example of an initializing process of the aircraft.
Figure 5:
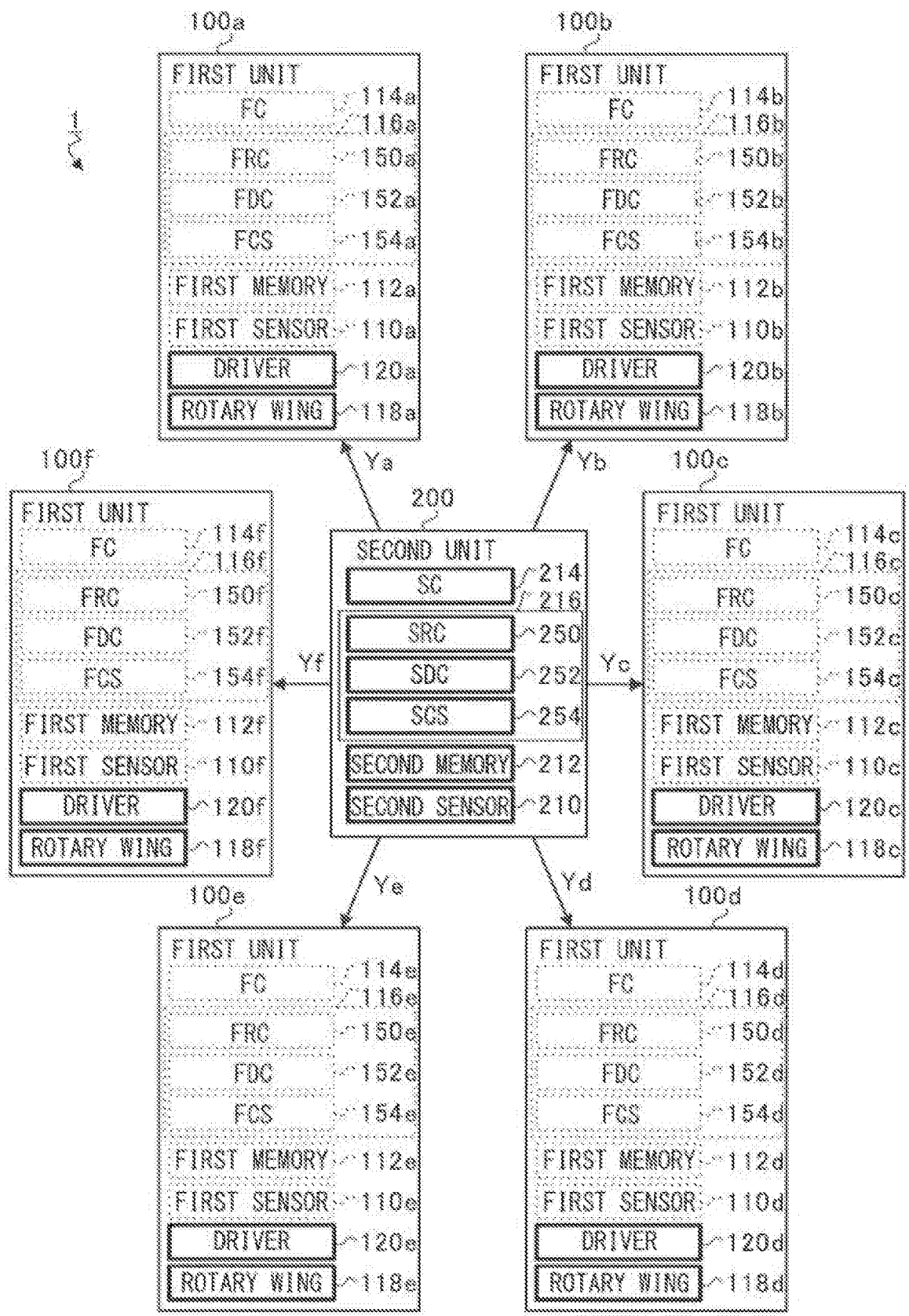
FIG. 5 is a schematic diagram illustrating an example of a normal state of the aircraft.

FIG. 4 is a flowchart illustrating an example of an initializing process of the aircraft 1. FIG. 5 is a schematic diagram illustrating an example of a normal state of the aircraft 1.

First, the second route calculator 250 of the second unit 200 may acquire a current location and a destination (step S300). Thereafter, the second route calculator 250 may calculate a flying route on the basis of the current location and the destination (step S302). Thereafter, the second route calculator 250 may cause the second memory 212 to hold the calculated flying route, and make a copy of the calculated flying route in the first memory 112 of each of the first units 100 (step S304).

In an example embodiment, the flying route may be copied in the first memories 112 (i.e., the first memories 112a to 112f) of all of the first units 100, allowing the six first units 100 (i.e., the first units 100a to 100f) and the second unit 200 to share the flying route. In other words, the flying route may be stored in both of the first memories 112 and the second memory 212.

Thereafter, the second control switcher 254 of the second unit 200 may set a control source to the second drive controller 252 of the second unit 200, on the premise that the aircraft 1 is normal (S306). The control source may be a source of control that outputs the drive signals to the six drivers 120. Accordingly, the second communicator 214, the second route calculator 250, the second drive controller 252, the second control switcher 254, the second memory 212, and the second sensor 210 of the second unit 200, each surrounded by a solid line in FIG. 5, operate effectively in the normal state following the initialization. In addition, the drivers 120 (i.e., the drivers 120a to 120f) and the rotary wings 118 (i.e., the rotary wings 118a to 118f) of the first units (i.e., the first units 100a to 100f), each surrounded by a solid line in FIG. 5, operate effectively in the normal state following the initialization.

Thereafter, the second drive controller 252 of the second unit 200 may acquire the current flying state by the second sensor 210 (step S308). For example, the second drive controller 252 may acquire the flying position, the orientation of movement, and the attitude as the current flying state. Thereafter, the second drive controller 252 may read out the flying route and the control law "f" from the second memory 212. Further, the second drive controller 252 may generate the drive signals Ya to Yf to be supplied to the respective drivers 120 (i.e., the drivers 120a to 120f) of the first units 100, with use of the read-out control law "f" and on the basis of the flying route and the current flying state acquired by the second sensor 210 (step S310).

The control law "f" may be stored in advance in the second memory 212. The control law "f" may be a mathematical function configured to generate the drive signals Ya to Yf of the respective six rotary wings Ya to Yf such that the current flying state is brought closer to the flying route. The control law "f" may be configured to generate the drive signals Ya to Yf in a case where one flying route and the flying state obtained by one sensor (e.g., the second sensor 210) are at least supplied, and on the basis of a difference between one flying route and the flying state obtained by one sensor. For example, the control law "f" may be configured to so generate the drive signals Ya to Yf as to cause the difference to be 0 (zero). In an example embodiment, the drive signals of the respective six rotary wings 118 may be generated independently from one another. In other words, the drive signals do not influence each other between the six rotary wings 118, and the drive signals Ya to Yf of the respective rotary wings 118 are uniquely determined by one flying route and the flying state obtained by one sensor.

The driver 120 of each of the first units 100 knows a location in the aircraft 1 at which the rotary wing 118 of the own first unit 100 is provided. The driver 120 of each of the first units 100 may thus receive corresponding one of the drive signals Ya to Yf generated by the second drive controller 252, on the basis of the location at which the rotary wing 118 of the own first unit 100 is provided. For example, the driver 120a of the first unit 100a may receive the drive signal Ya, and the driver 120b of the first unit 100b may receive the drive signal Yb. The driver 120c of the first unit 100c may receive the drive signal Yc, and the driver 120d of the first unit 100d may receive the drive signal Yd. The driver 120e of the first unit 100e may receive the drive signal Ye, and the driver 120f of the first unit 100f may receive the drive signal Yf.

The drivers 120 (i.e., the drivers 120a to 120f) of the respective first units 100 may control the number of rotations of the corresponding rotary wings 118 (i.e., the rotary wings 118a to 118f) on the basis of the received drive signals (step S312). The drivers 120 (i.e., the drivers 120a to 120f) of the respective first units 100 each may repeat the processes from step S308 to S312, allowing for an appropriate flying control of the aircraft 1.

It is to be noted that the control law "f" is stored not only in the second memory 212 of the second unit 200 but also in the first memories 112 of the respective first units 100. In other words, the control laws "f" are equal to each other between the first units 100, and between the first units 100 and the second unit 200. Accordingly, the control source that outputs the drive signals to the drivers 120 may be set not only to the second drive controller 252 of the second unit 200 but also to any of the first drive controllers 152 of the first units 100.

Hence, the drivers 120 of the first units 100 are able to control the number of rotations of the respective rotary wings 118 by receiving the drive signals from the second unit 200. In addition, each of the drivers 120 of the first units 100 is also able to generate the drive signal by the own first unit 100 independently to control the number of rotations of its rotary wing 118. With this example configuration, the six first units 100 and the second unit 200 share the same flying route and the same control law "f", making it possible to address various concerns as described later in greater detail.

It is to be noted that, in an example embodiment, the control law "f" may be stored in advance in the first memories 112 and the second memory 212, and the flying route may be copied from the second unit 200 to the first memories 112 of the respective first units 100 upon startup. In an alternative example embodiment, the flying route and the control law "f" may be copied from the second unit 200 to the first memories 112 of the respective first units 100 upon the startup. Further, an example embodiment may copy the control law "f" as it is. In an alternative example embodiment, however, the control law "f" may be separated into mathematical functions that derive the respective drive signals Ya to Yf, and the mathematical functions may be copied individually to the respective first units 100a to 100f.

Figure 6:
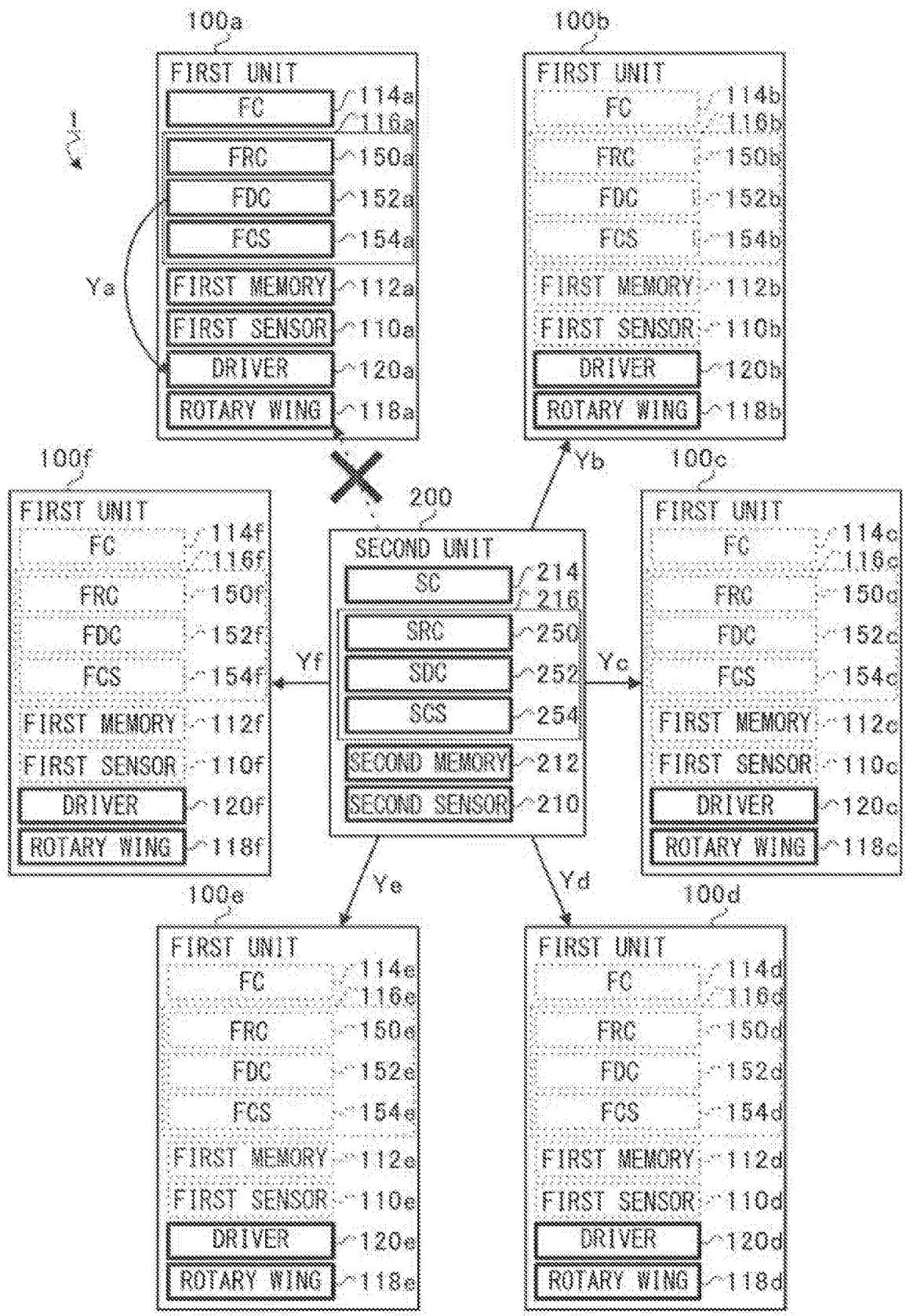
FIG. 6 is a schematic diagram illustrating an example of another state of the aircraft.

FIG. 6 is a schematic diagram illustrating an example of another state of the aircraft 1. FIG. 6 illustrates an example in which a communication between the second unit 200 and a part of the first units 100 (the first unit 100a in an example of FIG. 6) is not normal, e.g., disconnected, as denoted by "x" in FIG. 6.

First, the second control switcher 254 of the second unit 200 may set the control source of the five drivers 120 (i.e., the drivers 120b to 120f) of the respective first units 100b to 100f to the second drive controller 252 of the second unit 200, on the premise that the communication between the second unit 200 and the first units 100 other than the first unit 100a (i.e., the first units 100b to 100f) is normal. In addition thereto or concurrently, the first control switcher 154a of the first unit 100a may set a control source of the driver 120a of the first unit 100a to the first drive controller 152a of the first unit 100a, on the premise that the communication between the first unit 100a and the second unit 200 is not normal.

Accordingly, the second communicator 214, the second route calculator 250, the second drive controller 252, the second control switcher 254, the second memory 212, and the second sensor 210 of the second unit 200 operate effectively for the first units 100b to 100f. In addition, the drivers 120 and the rotary wings 118 of the respective first units 100b to 100f operate effectively for the first units 100b to 100f. For example, the second drive controller 252 of the second unit 200 may read out the flying route and the control law "f" from the second memory 212. Further, the second drive controller 252 may generate the drive signals Yb to Yf to be supplied to the drivers 120 of the respective first units 100b to 100f, with use of the read-out control law "f" and on the basis of the flying route and the current flying state acquired by the second sensor 210. Thereafter, the drivers 120 (i.e., the drivers 120b to 120f) of the respective first units 100b to 100f may control the number of rotations of the corresponding rotary wings 118 (i.e., the rotary wings 118b to 118f) on the basis of the corresponding generated drive signals Yb to Yf.

Meanwhile, the first communicator 114a, the first route calculator 150a, the first drive controller 152a, the first control switcher 154a, the first memory 112a, the first sensor 110a, the driver 120a, and the rotary wing 118a of the first unit 100a operate effectively for the first unit 100a. For example, the first drive controller 152a of the first unit 100a may read out the flying route and the control law "f" from the first memory 112a. Further, the first drive controller 152a may generate the drive signal Ya to be supplied to the driver 120a of the own first unit 100a, with use of the read-out control law "f" and on the basis of the flying route and the current flying state acquired by the first sensor 110a. Thereafter, the driver 120a of the first unit 100a may control the number of rotations of the rotary wing 118a on the basis of the generated drive signal Ya.

In some example embodiments, the first drive controller 152a may once generate the drive signals Ya to Yf for all of the drivers 120 of the respective first units 100, with use of the control law "f" and on the basis of the flying route and the current flying state. In such example embodiments, the first drive controller 152a may then extract only the drive signal Ya and output the extracted drive signal Ya to the driver 120a. In an alternative example embodiment, the first drive controller 152a may use in advance only a mathematical function that derives the drive signal Ya out of the control law "f". In such an alternative example embodiment, the first drive controller 152a may generate only the drive signal Ya with use of the mathematical function and on the basis of the flying route and the current flying state, and output the generated drive signal Ya to the driver 120a.

In a case where the communication between the second unit 200 and the first unit 100a is already not normal upon the startup of the aircraft 1, the first route calculator 150a of the first unit 100a may determine a flying route on the basis of the current location acquired by the first sensor 110a and the destination received via the first communicator 114a, independently from the second unit 200. In a case where it is necessary to determine a flying route again during flight of the aircraft 1, the first route calculator 150a of the first unit 100a may also determine the flying route on the basis of the current location acquired by the first sensor 110a and the destination received via the first communicator 114a, independently from the second unit 200.

In an example embodiment, the second processor 216 of the second unit 200 comprehensively controls the first units 100b to 100f in each of which the communication is normal, and the first processor 116a of the own first unit 100a independently controls the first unit 100a in which the communication is not normal. Accordingly, it is possible to control the flight of the aircraft 1 normally even when the communication is not performed normally.

Note that the communication between the second unit 200 and the first unit 100a is not normal in an example embodiment described above. However, the processes according to an example embodiment described above are applicable to any case where the communication between the second unit 200 and any of the first units 100b to 100f is not normal. The number of first units 100 in which the communication is not normal is not limited to one, and the processes according to an example embodiment described above are applicable to any case where the communication between the second unit 200 and two or more or all of the first units 100 is not normal. In such an alternative example embodiment, the first units 100 in each of which the communication is not normal may establish the control system independently from each other.

Further, an example embodiment described above causes only the first unit 100 in which the communication is not normal to be independent and causes other first units 100 to be under the control of the second processor 216 collectively. One reason is that an error can occur in a result of the detection of the first sensor 110 that serves as input of the control, if the first units 100 are to be controlled independently. In other words, an error can occur in the flying state if the first units 100 are to be controlled independently. Another reason is that, in a case where the current location is to be acquired by the first sensors 110 and/or the destination is to be acquired via the first communicators 114, acquired pieces of data can vary if variation occurs in timings at which the current location is acquired by the first sensors 110 and/or in timings at which the destination is acquired via the first communicators 114. Accordingly, an example embodiment causes the second processor 216 of the second unit 200 to comprehensively control the first units 100 other than any first unit 100 in which the communication is not normal to prevent a mismatch in flying control caused by an error as much as possible.

Figure 7:
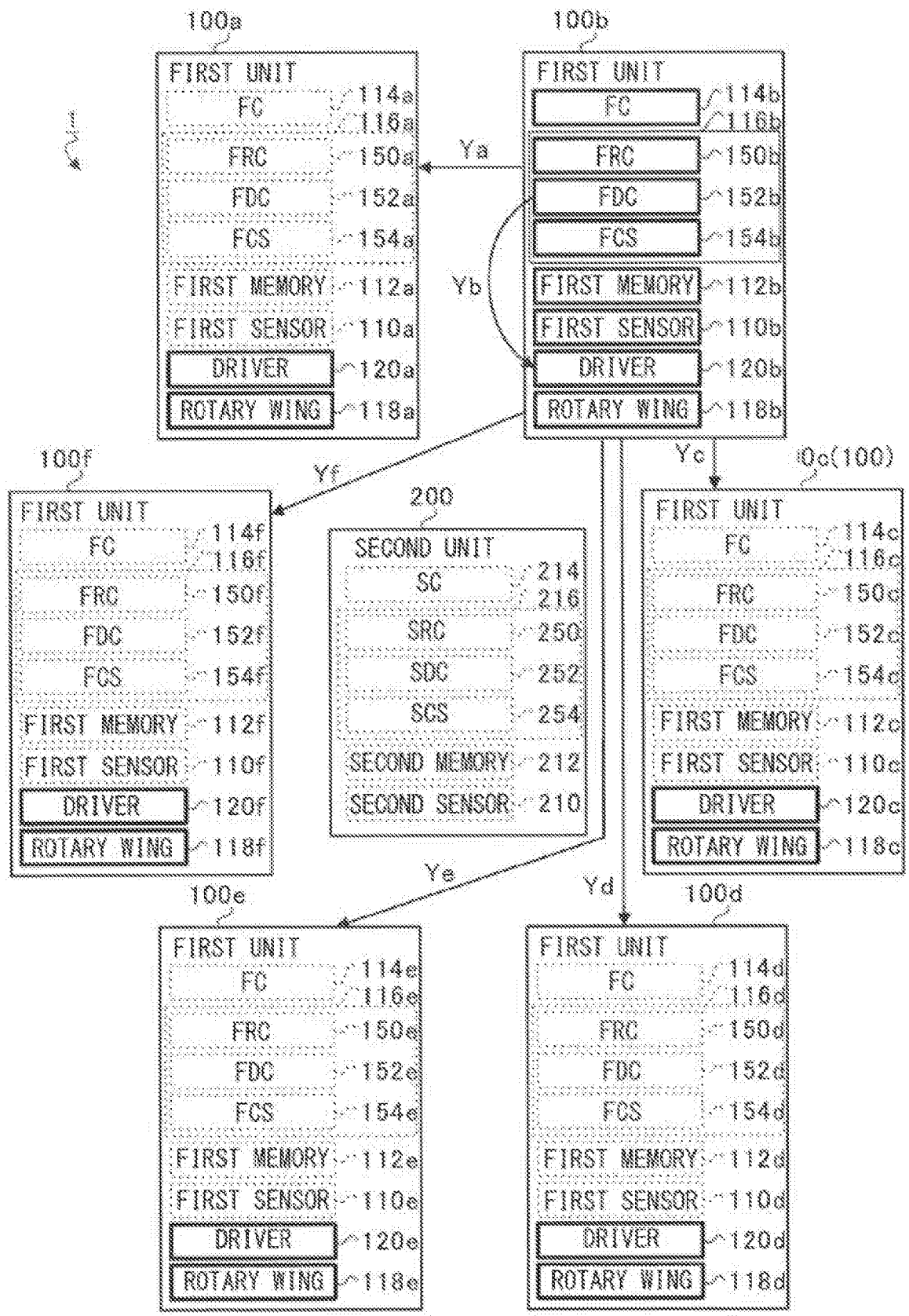
FIG. 7 is a schematic diagram illustrating an example of yet another state of the aircraft.

FIG. 7 is a schematic diagram illustrating an example of yet another state of the aircraft 1. FIG. 7 illustrates an example in which the communication between the second unit 200 and each of the first units 100 (i.e., the first units 100a to 100f) is normal but the second processor 216 does not operate normally.

The second processor 216 and the first processors 116 may operate substantially equally as described above. Thus, any of the first processors 116 may be able to comprehensively control each of the first units 100 in place of the second processor 216.

For example, the first control switcher 154 (in this example, the first control switcher 154b) of any of the first units 100 (in this example, the first unit 100b) may switch the control source from the second drive controller 252 of the second unit 200 to the first drive controller 152b of the first unit 100b. The first drive controller 152b may read out the flying route and the control law "f" from the first memory 112b. Further, the first drive controller 152b may generate the drive signals Ya to Yf to be supplied to the drivers 120 (i.e., the drivers 120a to 120f) of the respective first units 100a to 100f including the own first unit 100b, with use of the read-out control law "f" and on the basis of the flying route and the current flying state acquired by the first sensor 110b. Thereafter, the drivers 120 of the respective first units 100a to 100f may control the number of rotations of the corresponding rotary wings 118 (i.e., the rotary wings 118a to 118f) on the basis of the corresponding generated drive signals Ya to Yf.

In an example in which the thus-switched first processor 116 does not operate normally as well, the first control switcher 154 of any other first unit 100 may switch the control source from the first drive controller 152 of the first unit 100 in which the first processor 116 does not operate normally to the first drive controller 152 of the own first unit 100.

Accordingly, it is possible to control the flight of the aircraft 1 normally even when any processor that serves as the control source does not operate normally.

Figure 8:
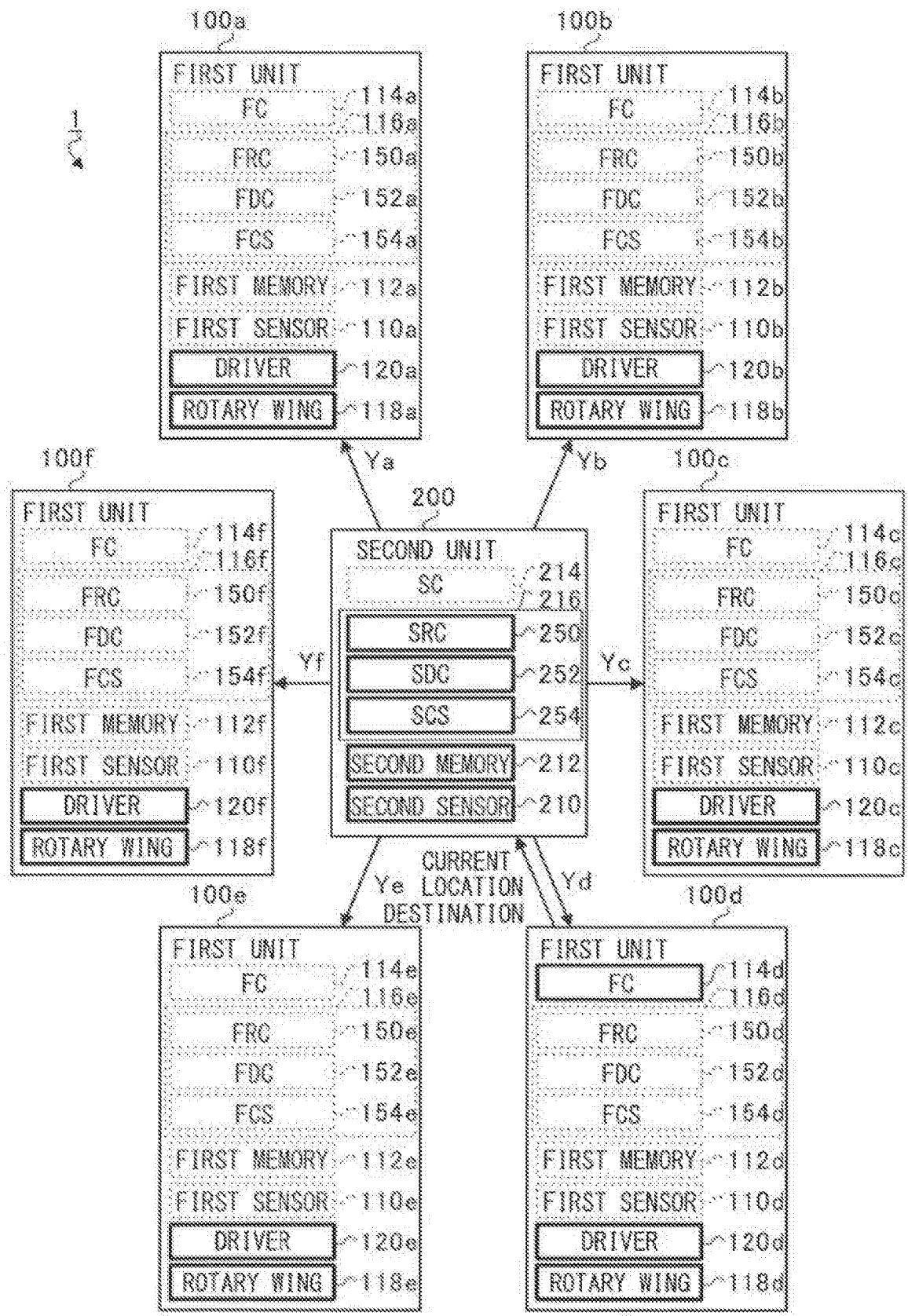
FIG. 8 is a schematic diagram illustrating an example of still another state of the aircraft.

FIG. 8 is a schematic diagram illustrating an example of still another state of the aircraft 1. FIG. 8 illustrates an example in which any of the configuration parts structuring the second unit 200 (in this example, the second communicator 214) does not operate normally.

The second communicator 214 and the first communicators 114 may be substantially the same in configuration as each other as described above. Thus, the second route calculator 250 may acquire the destination by any of the first communicators 114 (in this example, the first communicator 114d) in place of the second communicator 214.

For example, the second control switcher 254 of the second unit 200 may switch, from the second communicator 214 to the first communicator 114 (in this example, the first communicator 114d) of any of the first units 100 (in this example, the first unit 100d), a source that establishes a communication with the external device or the external object, in response to the second communicator 214 that does not operate normally. The second route calculator 250 may determine a flying route on the basis of the current location acquired by the second sensor 210 and the destination received via the first communicator 114d.

Accordingly, it is possible to substitute any of the configuration parts of the second unit 200 with corresponding any of the configuration parts of the first unit 100 in a case where the any of the configuration parts of the second unit 200 does not operate normally. In addition, in a case where the control source has been switched from the second drive controller 252 of the second unit 200 to the first drive controller 152 of the first unit 100, it is possible to substitute any of the configuration parts of that first unit 100 with corresponding any of the configuration parts of any other first unit 100.

Further, in a case where the second unit 200 and the first units 100 have their respective independent batteries as power sources, those batteries may be shared to interchange electric power.

Accordingly, it is possible to control the flight of the aircraft 1 normally even when any of the configuration parts does not operate normally.

At least one embodiment also provides a program that causes a computer to control the aircraft 1, and a computer-readable recording medium that stores the program.

Non-limiting examples of the recording medium may include a flexible disk, a magneto-optical disk, ROM, CD, DVD (Registered Trademark), and BD (Registered Trademark). As used herein, the term "program" may refer to a data processor written in any language and any description method.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the aircraft 1 according to the foregoing example embodiment may include the plurality of first units 100 and the second unit 200. In an alternative example embodiment, the aircraft 1 may include the plurality of first units 100, without the second unit 200. In such an alternative example embodiment, the first processor 116 of any of the first units 100 may operate equally as the second processor 216 of the second unit 200.

Further, in such an alternative example embodiment, after the flying route is held in the first memory 112 of each of the first units 100, it is possible for one of the first processors 116 to control the entire first units 100, or it is also possible for the first processors 116 of the respective first units 100 to control their own respective first units 100. With this configuration, it is possible to provide an inexpensive, simple aircraft 1 that includes only the first units 100.

The control law "f" in an example embodiment described above may be the mathematical function configured to independently generate the drive signals Ya to Yf of the respective six rotary wings Ya to Yf such that the current flying state is brought closer to the flying route. The control law "f" may be configured to generate the drive signals Ya to Yf in a case where one flying route and the flying state obtained by one sensor are at least supplied, and on the basis of the difference between one flying route and the flying state obtained by one sensor. An alternative example embodiment may perform feedback of another drive signal when generating any of the drive signals. With this configuration, it is possible to increase accuracy of the flying control. A yet another alternative example embodiment may perform feedback of an actual number of rotations, or a result of driving, of the rotary wing 118 of another first unit 100. With this configuration, it is possible to address abnormality of a part of the rotary wings 118 even when the abnormality occurs in the part of the rotary wings 118.

COMPARATIVE EXAMPLE

For example, JP-T No. 2009-523658 discloses a technique in which multiple controllers are switchably coupled to each other in a flying control system that controls an aircraft. When a main control signal fed from one of the controllers is not valid, the technique switches over to a backup control signal fed by any other controller out of the controllers.

A flying control system, such as that disclosed in JP-T No. 2009-523658, includes a plurality of controllers that are coupled to each other for redundancy, and switches the connection of the controllers to maintain flight upon malfunctioning of any of the controllers. Such a flying control system, however, is based on the premise that a communication is established between the plurality of controllers, meaning that another controller is no longer able to fulfill a backup function if the communication breaks down between the controllers.

To address this, one method may be to cause signal lines that take the role in the communication to be physically redundant to prevent the communication from breaking down. However, it is difficult to wire such redundant signal lines efficiently in an aircraft having a plurality of rotary wings, or in an aircraft having a complicated airframe shape.

It is desirable to provide an aircraft that makes it possible to ensure a safety appropriately even in a case where the aircraft has a plurality of rotary wings.

According to at least one embodiment, it is possible to ensure a safety appropriately even in a case where an aircraft has a plurality of rotary wings.

The first drive controller 152 and the second drive controller 252 respectively illustrated in FIGS. 2 and 3 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the first drive controller 152 and the second drive controller 252. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the first drive controller 152 and the second drive controller 252 respectively illustrated in FIGS. 2 and 3.

The invention claimed is:
1. An aircraft comprising
a first unit including:
a first sensor configured to detect a flying state of the aircraft, the flying state including a flying position of the aircraft and an orientation of movement of the aircraft;
a first rotary wing operative to provide the aircraft with lift, thrust, or both;
a first driver configured to drive the first rotary wing based on a first drive signal;
a first communicator;
a first memory; and
a first processor;
a second unit including:
a second sensor configured to detect the flying state of the aircraft;
a second rotary wing operative to provide the aircraft with lift, thrust, or both;
a second driver configured to drive the second rotary wing based on a second drive signal;
a second communicator;
a second memory; and
a second processor; and
a third unit including:
a third sensor configured to detect the flying state of the aircraft;
a third communicator;
a third memory; and
a third processor,
wherein the first and second units are disposed at positions that are different from each other in planar view,
wherein the first to third units are configured to communicate with each other,
wherein each of the first to third memories stores same first predetermined control information and same second predetermined control information, the first predetermined control information is a transfer function for generating a target flying route of the aircraft from the flying state and a destination, the second predetermined control information is a transfer function for generating the first and second drive signals from the flying state and the target flying route,
wherein the third unit is configured to:
when the third communicator receives the destination from other than the first and second units, i) generate the target flying route by the third processor using the first predetermined control information based on the received destination and the flying state detected by the third sensor, ii) transmit the target flying route generated by the third processor to the first and second units, iii) generate the first and second drive signals by the third processor using the second predetermined control information based on the flying state detected by the third sensor and the target flying route generated by the third processor, and iv) transmit the first and second drive signals generated by the third processor to the first and second units; and
when the third unit receives the destination from the first or second unit in a case where the third communicator does not receive the destination from other than the first and second units, i) generate the target flying route by the third processor using the first predetermined control information based on the destination received from the first or second unit and the flying state detected by the third sensor, ii) transmit the target flying route generated by the third processor to the first and second units, iii) generate the first and second drive signals by the third processor using the second predetermined control information based on the flying state detected by the third sensor and the target flying route generated by the third processor, and iv) transmit the first and second drive signals generated by the third processor to the first and second units, wherein the first unit is configured to:

when the first communicator receives the destination from other than the second and third units, transmit the received destination to the third unit;

when the first unit receives the target flying route from the third unit, store the received target flying route to the first memory;

when the first unit receives the first drive signal from the third unit, drive the first driver based on the received first drive signal from the third unit;

when the first unit does not receive the first drive signal from the third unit, i) generate the first and second drive signals by the first processor using the second predetermined control information based on the flying state detected by the first sensor and the target flying route stored in the first memory, ii) drive the first driver based on the first drive signal generated by the first processor, and iii) transmit the second drive signal generated by the first processor to the second unit; and when the first communicator receives the destination from other than the second and third units in a case where the first unit does not receive the first drive signal from the third unit, i) generate the target flying route by the first processor using the first predetermined control information based on the destination received by the first communicator and the flying state detected by the first sensor, ii) replace the target flying route stored by the first memory with the target flying route generated by the first processor, iii) transmit the target flying route generated by the first processor to the second unit, iv) generate the first and second drive signals by the first processor using the second predetermined control information based on the flying state detected by the first sensor and the target flying route stored by the first memory, v) drive the first driver based on the first drive signal generated by the first processor, and vi) transmit the second drive signal generated by the first processor to the second unit, and wherein the second unit is configured to:

when the second communicator receives the destination from other than the first and third units, transmit the received destination to the third unit;

when the second unit receives the target flying route from the first or third unit, store the received target flying route to the second memory;

when the second unit receives the second drive signal from the third unit, drive the second driver based on the received second drive signal from the third unit;

when the second unit receives the second drive signal from the first unit in a case where the second unit does not receive the second drive signal from the third unit, drive the second driver based on the received second drive signal from the first unit;

when the second unit does not receive the second drive signal from the first and third units, i) generate the second drive signal by the second processor using the second predetermined control information based on the flying state detected by the second sensor and the target flying route stored by the second memory, and ii) drive the second driver based on the second drive signal generated by the second processor; and when the second communicator receives the destination from other than the first and third units in a case where the second unit does not receive the second drive signal from the first and third units, i) generate the target flying route by the second processor using the first predetermined control information based on the destination received by the second communicator and the flying state detected by the second sensor, ii) replace the target flying route stored by the second memory with the target flying route generated by the second processor, iii) generate the second drive signal by the second processor using the second predetermined control information based on the flying state detected by the second sensor and the target flying route stored by the second memory, and iv) drive the second driver based on the second drive signal generated by the second processor.

* * * * *